US012782637B2

(12) United States Patent
Alexeev et al.

(10) Patent No.: US 12,782,637 B2
(45) Date of Patent: Nov. 3, 2026

(54) OPTICAL WAVEGUIDE MANUFACTURING METHOD

(71) Applicant: Snap Inc., Santa Monica, CA (US)

(72) Inventors: Arseny Alexeev, Drayton (GB); Venkata Karthik Nagareddy, Swindon (GB); Nirdesh Ojha, Schaerding (AT); Philip Andrew Greenhalgh, Battle (GB); David Hayes, Robertsbridge (GB)

(73) Assignee: Snap Inc., Santa Monica, CA (US)

( * ) Notice: Subject to any disclaimer, the term of this patent is extended or adjusted under 35 U.S.C. 154(b) by 296 days.

(21) Appl. No.: 18/719,675

(22) PCT Filed: Dec. 21, 2022

(86) PCT No.: PCT/EP2022/087187

§ 371 (c)(1),
(2) Date: Jun. 13, 2024

(87) PCT Pub. No.: WO2023/118266

PCT Pub. Date: Jun. 29, 2023

(65) Prior Publication Data

US 2025/0085477 A1 Mar. 13, 2025

(30) Foreign Application Priority Data

Dec. 22, 2021 (EP) .................................... 21217101

(51) Int. Cl.
*G02B 6/132* (2006.01)
*G02B 6/10* (2006.01)
(Continued)

(52) U.S. Cl.
CPC ............. *G02B 6/132* (2013.01); *G02B 6/107* (2013.01); *G02B 6/136* (2013.01);
(Continued)

(58) Field of Classification Search
CPC ......... G02B 6/126; G02B 6/107; G02B 6/136
See application file for complete search history.

(56) References Cited

U.S. PATENT DOCUMENTS

2016/0320696 A1* 11/2016 Nishimura ............ G03F 7/0002
2019/0302611 A1 10/2019 Singh et al.
2020/0247016 A1* 8/2020 Calafiore .............. C23C 16/345

FOREIGN PATENT DOCUMENTS

EP 2343730 A1 7/2011
EP 4202547 A1 6/2023
(Continued)

OTHER PUBLICATIONS

"Chinese Application Serial No. 202280080790.1, Voluntary Amendment filed Oct. 10, 2024", w/ English claims, 9 pgs.
(Continued)

*Primary Examiner* — Uyen Chau N Le
*Assistant Examiner* — Hoang Q Tran
(74) *Attorney, Agent, or Firm* — Schwegman Lundberg & Woessner, P.A.

(57) ABSTRACT

An optical waveguide manufacturing method includes: receiving a master template having a plurality of individual waveguide structures imprinted thereon; coating the master template with a curable master template stamp material; curing the master template stamp material to form a master template stamp; separating the master template stamp from the master template; imprinting the master template stamp onto one or more first substrates having an imprintable coating to form one or more master template copies, each master template copy having a plurality of individual waveguide structure copies imprinted thereon; curing the one or more master template copies; separating the master template stamp from the one or more master template copies; coating one of the one or more master template copies with a curable working stamp material; curing the working stamp material
(Continued)

to form a working stamp for manufacturing optical waveguides; and separating the master template copy from the working stamp.

15 Claims, 8 Drawing Sheets

(51) Int. Cl.
*G02B 6/136* (2006.01)
*G02B 6/12* (2006.01)

(52) U.S. Cl.
CPC .............. *G02B 2006/12038* (2013.01); *G02B 2006/12061* (2013.01); *G02B 2006/12069* (2013.01); *G02B 2006/12107* (2013.01); *G02B 2006/12173* (2013.01)

(56) References Cited

FOREIGN PATENT DOCUMENTS

| | | | |
|---|---|---|---|
| EP | 4202547 | B1 | 3/2024 |
| WO | WO-2020242385 | A1 | 12/2020 |
| WO | WO-2023118266 | A1 | 6/2023 |

OTHER PUBLICATIONS

"Korean Application Serial No. 10-2024-7014879, Notice of Preliminary Rejection mailed Aug. 18, 2025", w/ English Translation, 13 pgs.
"Korean Application Serial No. 10-2024-7014879, Response filed Dec. 11, 2025 to Notice of Preliminary Rejection mailed Aug. 8, 2025", w/ English claims, 45 pgs.
"European Application Serial No. 21217101.1, Extended European Search Report mailed Jun. 23, 2022", 4 pgs.
"European Application Serial No. 21217101.1, Intention to grant mailed Sep. 27, 2023", 6 pgs.
"European Application Serial No. 21217101.1, Response filed Jul. 13, 2023 to Extended European Search Report mailed Jun. 23, 2022", 31 pgs.
"International Application Serial No. PCT/EP2022/087187, International Search Report mailed Apr. 11, 2023", 4 pgs.
"International Application Serial No. PCT/EP2022/087187, Written Opinion mailed Apr. 11, 2023", 9 pgs.

* cited by examiner

OPTICAL WAVEGUIDE MANUFACTURING METHOD

CLAIM OF PRIORITY

This application is a U.S. national-phase application filed under 35 U.S.C. § 371 from International Application Serial No. PCT/EP2022/087187, filed on Dec. 21, 2022, and published as WO 2023/118266 on Jun. 29, 2023, which claims the benefit of priority to European Patent Application Serial No. 21217101.1, filed on Dec. 22, 2021, each of which is incorporated herein by reference in its entirety.

FIELD

The present invention generally relates to nanoimprint lithography methods, and specifically the manufacture of optical waveguides for augmented reality devices.

BACKGROUND

Augmented reality systems can be worn on a user's head to augment a user's perception of the real world by supplying additional light. Known head-mounted systems include glasses and helmet structures. Augmented reality systems also include head-up displays that can be implemented in vehicles, such as in cars, trucks or also in aircraft cockpits.

Augmented reality light may be provided to users using a waveguide structure. Diffraction gratings are positioned on or in the waveguides to couple light from a projector into a waveguide. A further diffraction grating structure can then be used to couple light out of the waveguide and towards a user. Other augmented reality technologies may be employed to generate similar results. The optical components, such as the waveguides or prisms, in these applications are typically transparent so that the user can view light from the projector as well as light from their external environment.

Waveguides typically include diffraction grating structures that are fabricated using nanoimprint replication processes and direct etching. These gratings structures may be a plurality of teeth or fins (also known as mesas) and can be formed in a low-index material, a high-index material, or a combination of low and high-index materials on a substrate such as glass or silicon.

Known manufacturing methods involve using lithography, etching, and imprinting techniques to make waveguide master patterns, and then using the master patterns to perform imprint replication to form a waveguide grating, waveguide structure, or to form an etching mask for creating waveguide gratings through subsequent etch processing. Imprinting techniques used to create waveguides include nanoimprint lithography which can effectively replicate detailed nanostructures for the diffraction gratings.

An object of the invention is to improve the capability of manufacturing methods whilst maintaining effective nanoreplication of detailed diffraction grating waveguide structures.

SUMMARY OF INVENTION

According to an aspect of the invention, there is provided an optical waveguide manufacturing method comprising: receiving a master template having a plurality of individual waveguide structures imprinted thereon; coating the master template with a curable master template stamp material; curing the master template stamp material to form a master template stamp; separating the master template stamp from the master template; imprinting the master template stamp onto one or more first substrates having an imprintable coating to form one or more master template copies, each master template copy having a plurality of individual waveguide structure copies imprinted thereon; curing the one or more master template copies; separating the master template stamp from the one or more master template copies; coating one of the one or more master template copies with a curable working stamp material; curing the working stamp material to form a working stamp for manufacturing optical waveguides; and separating the master template copy from the working stamp.

In this way, working stamps that are used to form production optical waveguides are made from a copy of a master template. In known production processes, a working stamp is formed directly from a master template. However, it has been found that imprinting techniques cause a master template and/or a working stamp quality to deteriorate with use. As such it has been found that forming a working stamp from a copy of a master template provides an optimal balance to ensure the longevity of the master template whilst minimising nanoreplication deterioration effects that can occur following multiple imprints. This significantly increases the manufacturing output from a single master template as well as lowering manufacturing costs.

Each of the plurality of individual waveguide structures imprinted on a master template copy is substantially identical to each of the plurality of individual waveguide structure copies on the master template. Nevertheless an imprinted structure, or nanostructure, from a stamp may often include defects or inconsistencies compared to the original structure or nanostructure from which the stamp is created. Due to current monitoring techniques and production methods, the shape deviation of an imprinted structure may not be easily detectable until a final product (optical waveguide) is manufactured.

It has also been found that a working stamp can be used up to one hundred times (typically between 50 to 100 times) before the mould structure/shape in the stamp deforms such that it results in poor quality optical waveguides being produced, i.e. where the waveguide structures in a production wafer and/or the optical performance of an individual waveguide are significantly different to the original waveguide structure in the master template. Therefore, in order to optimise the production efficiency of a master template, it has been advantageously found that working stamps used to make production waveguides can be formed from a copy of the master template.

Preferably, the method further comprises: imprinting the working stamp onto a second substrate having an imprintable coating to form an optical waveguide wafer, the optical waveguide wafer having a plurality of optical waveguides imprinted thereon; curing the optical waveguide wafer; separating the working stamp from the optical waveguide wafer; and cutting the optical waveguide wafer to separate each optical waveguide from the plurality of optical waveguides. In this way, the optical waveguides are formed and cut from the wafers for further stacking or assembly. For example, the optical waveguides may be assembled to construct an augmented reality display system.

Preferably, the method further comprises optically testing at least one of the one or more master template copies. In this way, a master template copy may be optically tested and quality assessed to monitor and predict the optical performance during the of production optical waveguides. The master template copy may be optically tested using known non-destructive testing techniques. The optical testing may be performed as an in-line production step in the optical waveguide manufacturing method to provide a quality control monitoring step.

Preferably, at least one of the one or more master template copies is made of a substantially optically transparent material. In this way a master template copy is optically functional and can tested to provide optical performance results for production optical waveguides. Optical testing can reveal defects or imperfections or aspects of the waveguide structure that may be modulated or modified to change the performance of a production optical waveguide. Preferably, the master template copy comprises a glass substrate coated with an optical polymer. In other words, the substantially optically transparent material may be a glass substrate coated with an optical polymer.

Preferably, at least one of the one or more master template copies comprises a silicon substrate. Preferably, at least one of the one or more master template copies comprises a polymer material for nanoreplication. The polymer material for nanoreplication may be a different polymer material that is used for optical testing. In other words, the nanoreplication polymer material may be different to the optical polymer described above. In this way a master template copy may be formed in a material that has good nanoreplication properties. This copy may or may not be optically functional. Known materials that are typically more robust at maintaining nanostructures can be used.

Preferably, the method further comprises controlling a shape in at least one of the plurality of individual waveguide structure copies. In this way the shape, and thus the critical nanostructure dimensions, of the waveguide structure can be modulated or controlled in various ways to increase or decrease the size of specific features in each waveguide structure. Preferably, controlling the shape or critical nanostructure dimensions, comprises a coating deposition technique and/or a plasma treatment technique. For example, plasma processing can be used to reduce specific critical dimensions of the grating nanostructures.

Alternatively, deposition techniques could be used in order to compensate for the polymer shrinkage. Other nanostructure dimension control techniques readily available to the skilled person may also be utilised to control the shape of the waveguide grating nanostructure in master template copies. The method may comprise applying a plasma treatment to control the critical nanostructures dimensions. An anti-stick layer may also be provided over the master templates and master template copies to ensure high quality separation of the stamps.

Preferably, the method further comprises applying an anti-sticking layer. An anti-sticking layer (ASL) can be used at any of the described stages when there is a separation event (e.g. when separating a stamp or mould structure from a cured material). ASL layers assist with smooth separation between two structures. A parent structure (e.g. a template structure or a stamp structure) may be coated with the anti-sticking layer before a curable material is applied thereon, or before it is imprinted into the curable material.

Preferably, the master template may be also formed by a step and repeat nanoimprint process. In this way the surface of a wafer can be optimally utilised such that multiple waveguide structures are provided on a single wafer. The step and repeat process uses a single waveguide master stamp (i.e. a stamp for a single waveguide structure), and imprints the single waveguide master stamp multiple times across the surface of an imprintable material coated wafer in a step-wise manner to form the master template (i.e. the master step and repeat template comprising a plurality of waveguide structures).

DESCRIPTION OF DRAWINGS

Embodiments of the present invention will now be described, by way of example only, with reference to the accompanying drawings in which.

DETAILED DESCRIPTION

The methods provided herein improve the efficiency of manufacturing optical waveguides by nanoimprint lithography processes by reducing structural deterioration of the grating structures as well as significantly reducing manufacturing costs and steps.

Figure 1A:
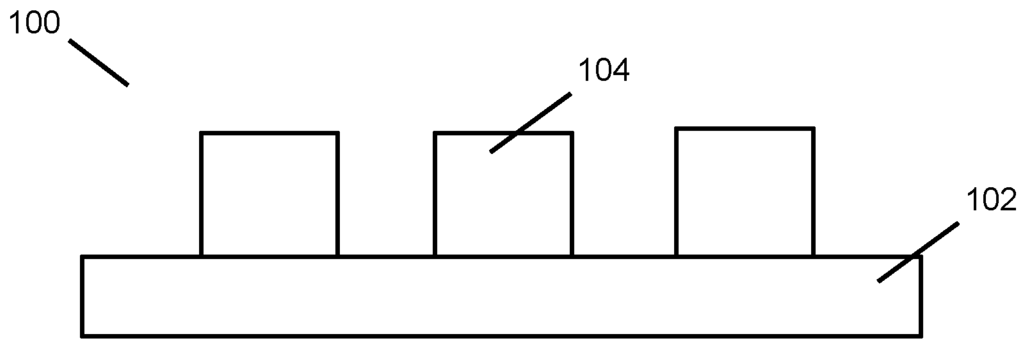
FIGS. 1*a-b* show schematic representations of different profiles of an optical waveguide grating nanostructures.
Figure 1B:
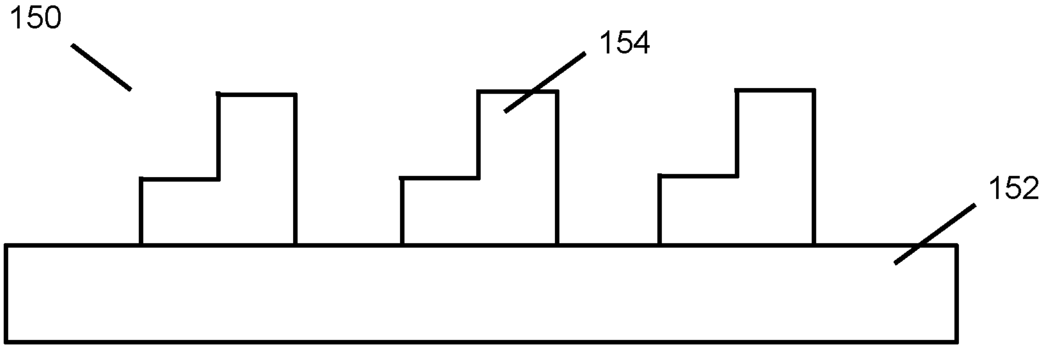

FIGS. 1A and 1B show different exemplary optical waveguide grating profiles. FIG. 1A shows an optical waveguide 100 having a transparent substrate 102 and a grating structure 104 formed upon the substrate 102. A resin remnant layer (not shown) may also be provided under the grating structure. The grating structure 104 may be a diffraction grating that is configured to input and/or output light into the optical waveguide 100 and the grating structure 104 has structural features in the micrometre and nanometre range in order to manipulate incoupled or outcoupled light. As shown in FIG. 1B an optical waveguide 150 may have a grating structure 154 on a substrate 152 that has multiple features as will be apparent to the person skilled in the art of diffraction gratings.

The optical waveguides 100, 150 can be formed using nanoimprinting or/and etching processes, where mask layers and pattern or stack layers are used to control the shape and structure of the gratings. A mask layer may be made from a metal or metal oxide or metal nitride, such as titanium nitride or tantalum nitride, or carbon, or another etch-resistant material using a thin-film deposition technique, such as chemical vapour deposition, physical vapour deposition, or atomic layer deposition. If grating structures are created using nanoimprinting, the pattern/stack layers are made of an imprintable resist material having a high refractive index.

A hard master is typically made of materials that are more robust than those used for the optical waveguides 100, 150 and may not be optically functional or transparent. Hard masters or master patterns are used in imprint replication processes, such as nanoimprint lithography to fabricate optical waveguides, as will be explained in detail below.

Figure 2:
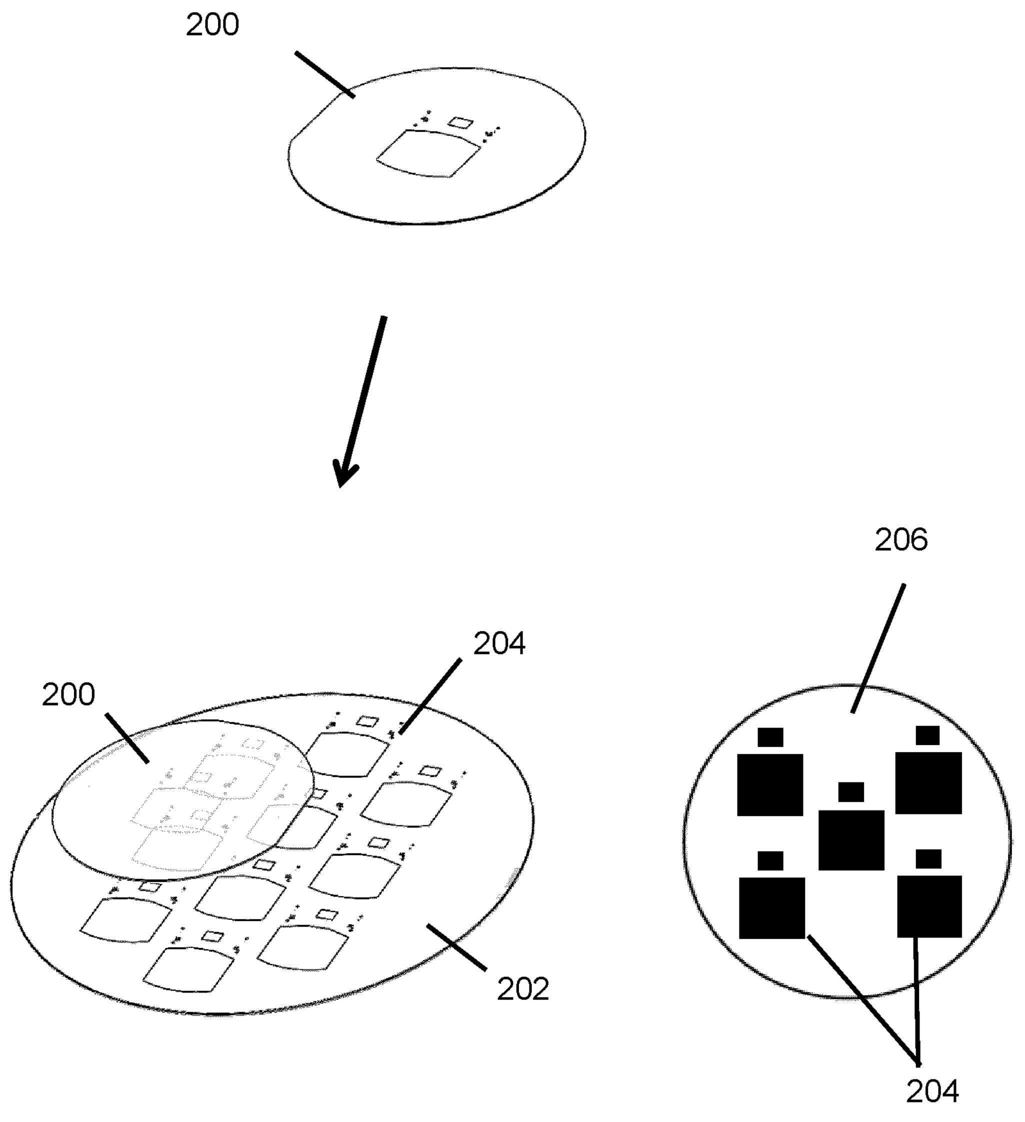
FIG. 2 shows a schematic representation of forming a step and repeat master template.

FIG. 2 shows a schematic representation of a step and repeat (SnR) master template, where a step and repeat stamp 200 of a single optical waveguide grating structure (which is inverse of the hard master template) is repeatedly imprinted across a wafer 202 in a step-wise manner. This is known as a step and repeat (SnR) nanoimprint lithography process. The wafer 202 is a spin coated wafer that has a substrate layer, a primer layer and an imprint resist layer. The imprint resist is a curable monomer or polymer material, which can be deformed to create an inverse or negative copy of the step and repeat stamp 200 within the imprint resist layer. Heat and/or UV light is applied to the imprint resist layer in order to cure/harden the imprint resist layer. Other suitable coated wafers will be apparent to the person skilled in the art.

In a step and repeat nanoimprint lithography process the step and repeat stamp 200 is imprinted, cured by heat and/or UV light and separated over the wafer 202 multiple times to cover the wafer 202 with hardened imprints 204 of the optical waveguide structure. This step and repeat process is repeated across the surface of the wafer 202 to optimally utilise and arrange a maximum number of hardened imprints 204 on the wafer 202 to provide an imprinted wafer 206. FIG. 2 also shows an exemplary top view of the imprinted wafer 206. The imprinted wafer 206 is a SnR master template which has a plurality of individual waveguide structures imprinted thereon. The number of imprinted structures on a wafer may vary according to the size of the grating structure and/or the wafer, as will be appreciated by the skilled person.

In this specific example the imprinted wafer 206 is typically non-optically functional, where the imprint resist material used is selected to have optimal nanoreplication properties intended for maintaining the detailed structure of the optical waveguide structure. Alternatively the imprinted wafer 206 may be optically functional or substantially transparent in order to allow for optical testing to determine the optical performance of the imprinted individual grating structures 204 on the wafer 206.

Figure 3A:
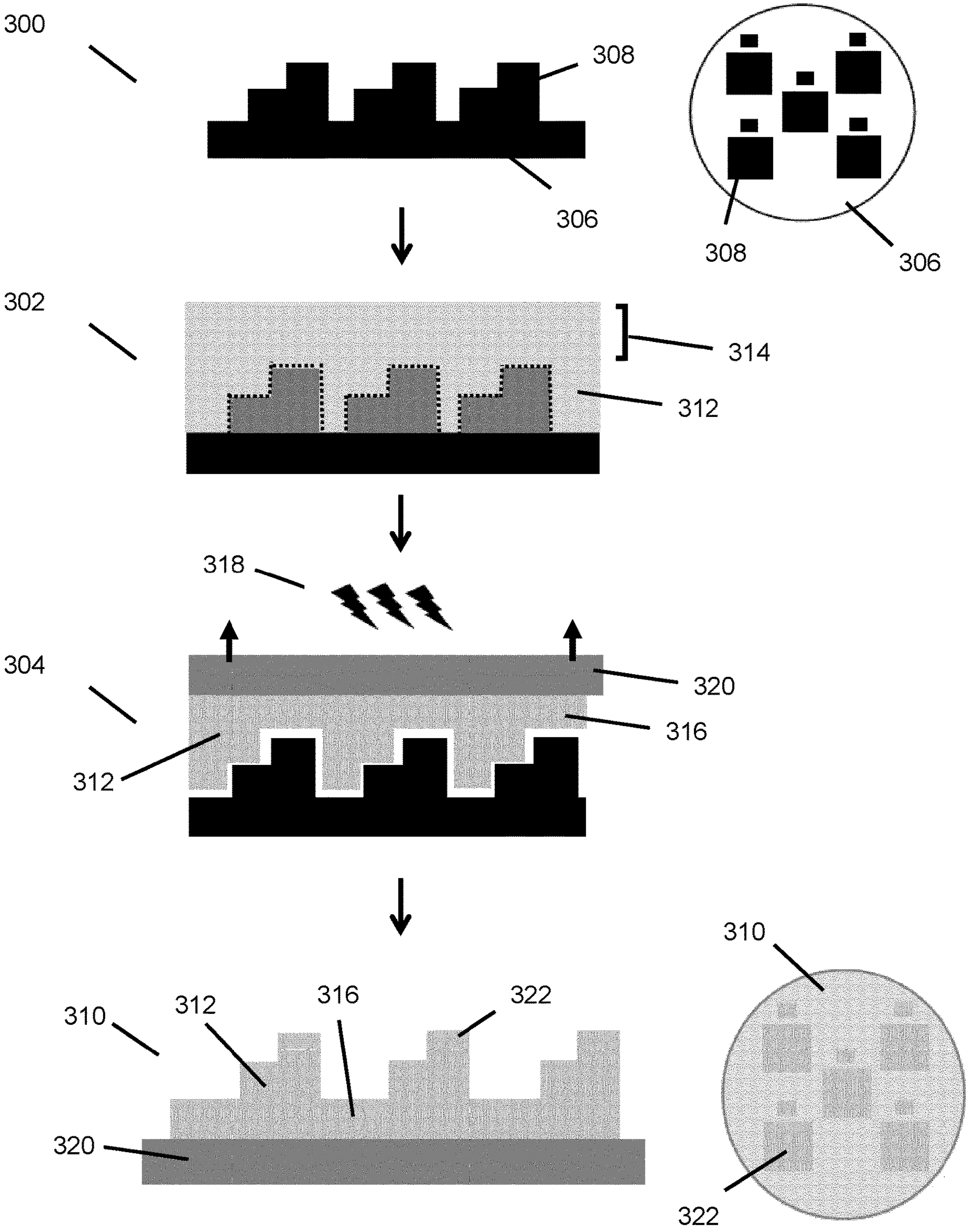
FIG. 3*a* shows a schematic representation of forming a template stamp from master template.

FIG. 3A illustrates in schematic form a process 300 having steps 302 and 304, where a master template 306 having a plurality of individual waveguide structures 308 is used to form a master template stamp 310. The master template 306 is either a hard master template or SnR master template, as that described in reference to FIG. 2, and a top view of the master template 306 is also shown in FIG. 3A.

At step 302 a curable template stamp material 312 is applied over the master template 308. This can be done by a spin coating method or other methods known in the art. As the stamp material 312 is applied over the template 306, the material flows over and fills any voids or spaces between the waveguide structures 308 thereby forming a mould or inverse copy of the shape of the waveguide structures. As seen at step 302 the height of the applied template stamp material 312 exceeds the maximum height of the waveguide structures 308 such that there is a predetermined thickness 314 or layer of template stamp material 312 that is not shaped by the waveguide structures 308. The unshaped thickness of template stamp material 312 provides a base layer 316 on which the mould of the waveguide structures 308 is formed.

At step 304 a first substrate 320 is applied to the curable template stamp material 312. In this example the first substrate 320 is a flexible foil which is brought into contact with the curable template stamp material 312. The first substrate may also be a rigid material such as glass or silicon, or even a semi-rigid material such as polydimethylsiloxane (PDMS). Heat and/or UV light 318 is then applied to the curable template stamp material 312 and the first substrate 320 to cure and harden the material. After curing the curable template stamp material 312 is hardened into a cured template stamp material.

The first substrate 320 and cured template stamp material 312 together form the master template stamp 310, which is used to create one or more copies of the master template 306 as will be explained in reference to FIG. 3B. The master template stamp 310 has a plurality of individual mould structures 322 which are inverse copies of the plurality of individual waveguide structures 308 of the master template 306.

Figure 3B:
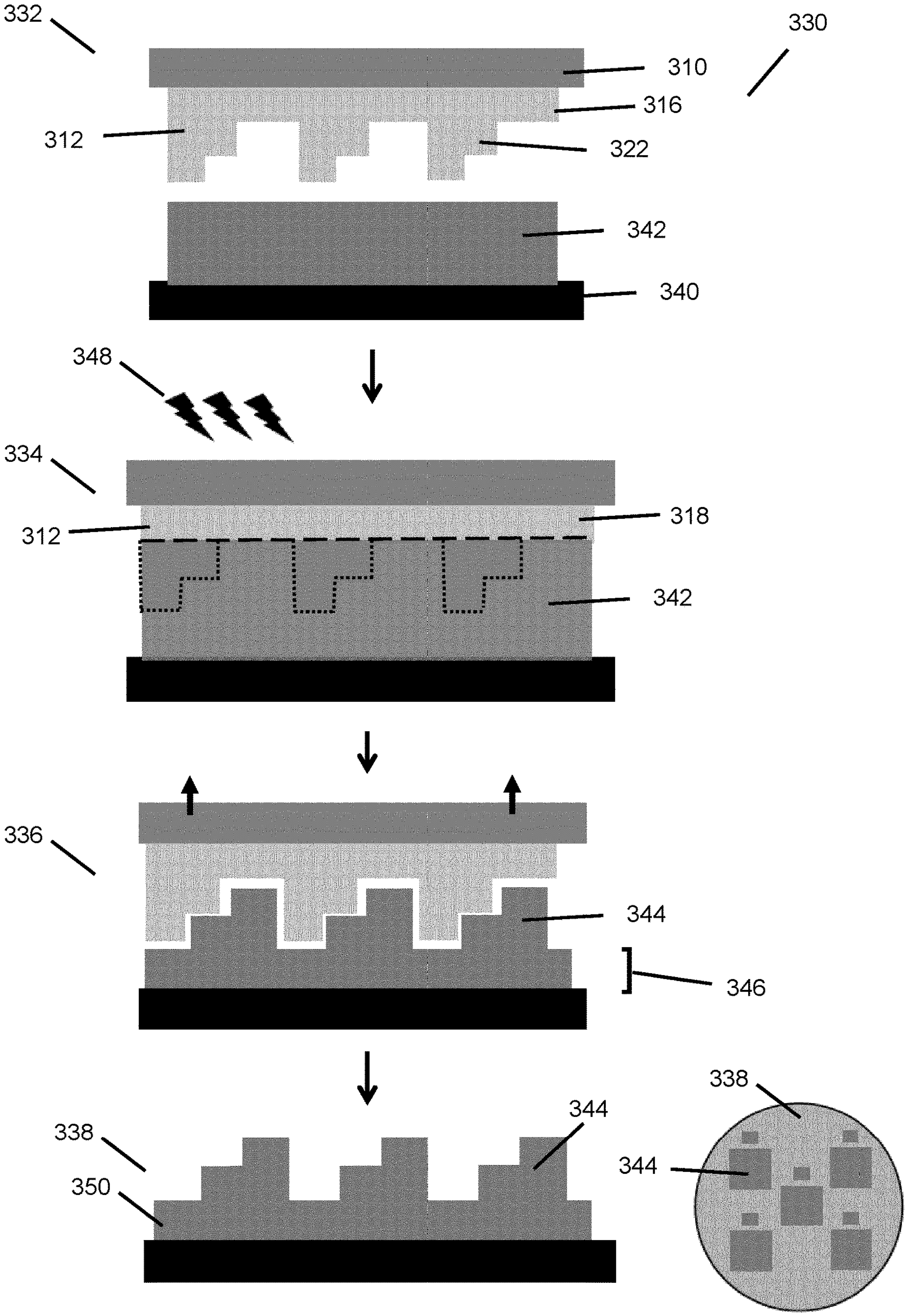
FIG. 3*b* shows a schematic representation of forming a master template copy using master template stamp.

FIG. 3B illustrates in schematic form a process 330 having steps 332, 334 and 336, where the master template stamp 310 having the plurality of individual mould structures 322, or stamp structures, is used to form a master template copy 338.

At step 332 the master template stamp 310 is lowered into a second substrate 340 having an imprintable coating 342 (imprint resist layer), such that at step 334 the mould structures 322 are imprinted the imprintable coating 342 to form waveguide structure copies 344 of the individual waveguide structures 308. This means that the master template stamp 310 is pressed into the imprintable coating 342 up to the base layer 316 of the cured stamp material 312 of the stamp 310. As seen at step 334 the height of the imprintable coating 342 is typically greater than the height of the mould structures 322 such that there is a predetermined thickness 346 of the imprintable coating 342 that is not deformed when the master template stamp 310 is pressed against the second substrate 340.

After imprinting the mould structures 322 into the imprintable coating 342, heat and/or UV light 348 is then applied to the second substrate 340 to cure and harden the imprintable coating 342. The undeformed thickness of hardened imprintable coating provides a base layer 350 on which the imprinted copies 344 of waveguide structures 308 are provided.

The master template stamp 310 is then separated from the imprinted second substrate at step 336, thus providing the master template copy 338. FIG. 3B also shows a top view of the master template copy 338. The master template copy 338 has a plurality of individual waveguide structures 344 that have substantially the same shape as the plurality of individual waveguide structures 308 of the master template 306. According to the present disclosure the master template copy 338 is used to create a production working stamp as will be explained in reference to FIG. 3C.

If more than one master template copy 338 is created, at least one of master template copies is used to form a production working stamp, and another one of the master template copies can be optically tested for quality control to ensure that the waveguide nanostructures have been adequately replicated. Each master template copy can be optically qualified before it is used to create a working stamp. It should be understood that the master template copy used to form a production working stamp may be non-optically functional and made of low refractive index materials that exhibit optimal nanoreplication properties (e.g. having robust mechanical and physical properties to maintain the transference to nanostructure details), whereas the master template copy to be optically tested will be made using substantially optically transparent materials to allow for optical testing to determine the optical performance of the individual grating structures.

Figure 3C:
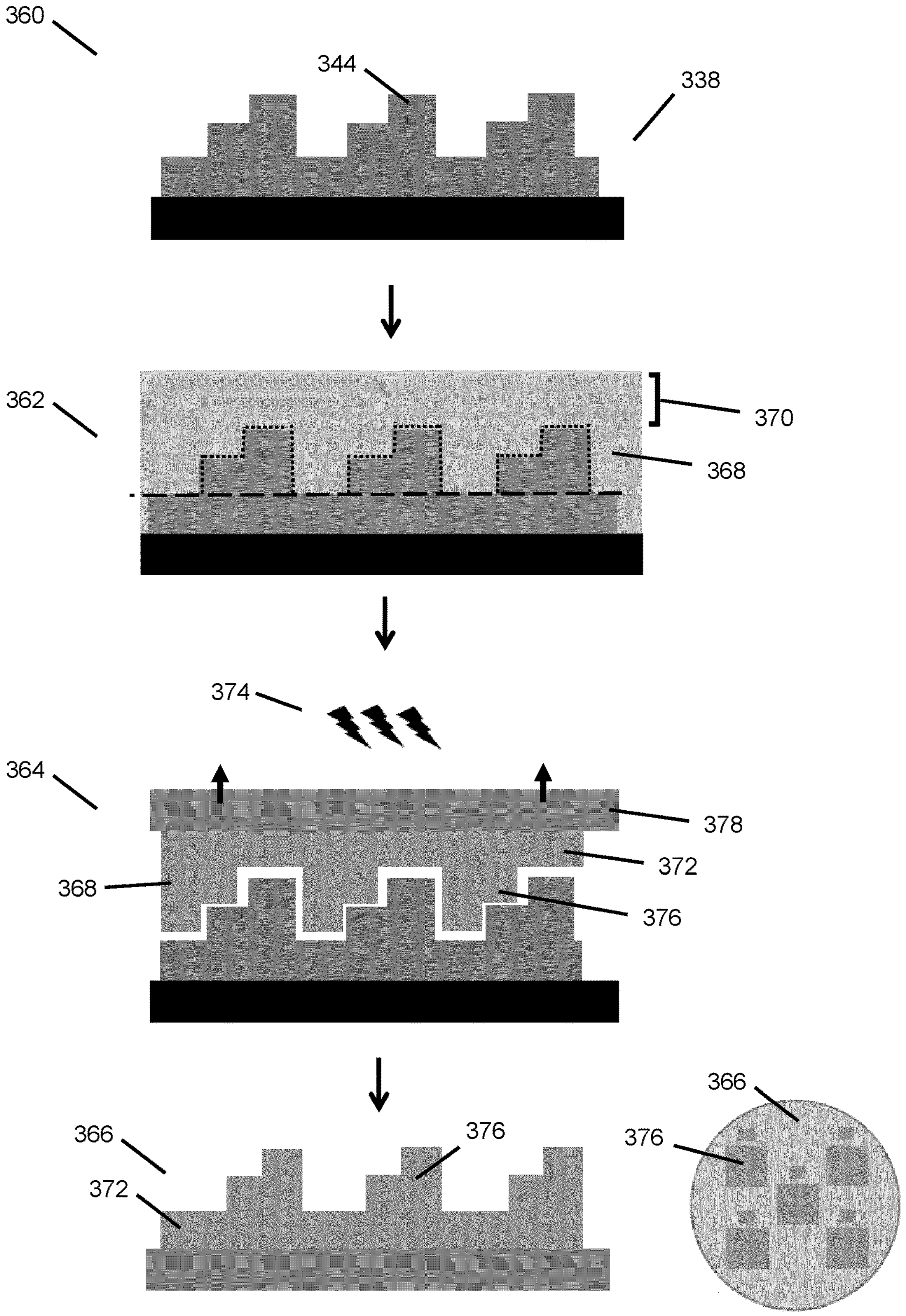
FIG. 3*c* shows a schematic representation of forming a working stamp from master template copy.

FIG. 3C illustrates in schematic form a process 360 having steps 362 and 364, where the master template copy 338 is used to form a working stamp 366 that is used to create production optical waveguide structures for an augmented reality system. It should be appreciated that the forming of a working stamp 366 follows a similar process to the forming of the master template stamp 310.

At step 362 a curable working stamp material 368 is applied over the master template copy 338 to forming an inverse copy of the shape of the waveguide structures 344 of the master template copy 338. The curable working stamp material 368 is selected to have optimal nanoreplication properties intended for maintaining the detailed structure of the imprinted waveguide structures 344.

The curable working stamp material 368 is applied such that its height exceeds the maximum height of the waveguide structures 344, and providing a layer 370 of working stamp material 368 that does not take the shape of the waveguide structures 344. The unshaped layer of working stamp material 368 thus provides a base layer 372 on which the mould structures 376 of the waveguide structures 344 is formed.

At step 364 a third substrate 372 is bonded to the curable worked stamp material 368. In this example the third substrate 378 is a flexible foil which is applied to the curable stamp material 368 in order to lift or otherwise separate the cured stamp material 368 from the master template copy 338 after curing. The third substrate may also be a rigid material such as glass or silicon, or even a semi-rigid material such as polydimethylsiloxane (PDMS). Heat and/or UV light 374 is then applied to the working stamp material 368 to cure and harden the material. After curing the working stamp material 368 is hardened into a cured template stamp material.

The third substrate 378 and cured working stamp material 368 together form the working stamp 366 having a plurality of mould structures 376, which is used to create one or more production optical waveguides as will be explained in reference to FIG. 4.

Figure 4A:
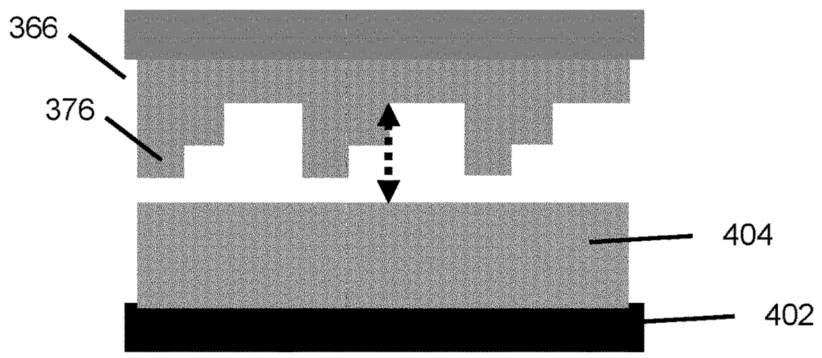
FIG. 4*a* shows a schematic representation of manufacturing optical waveguides using working stamp.
Figure 4B:
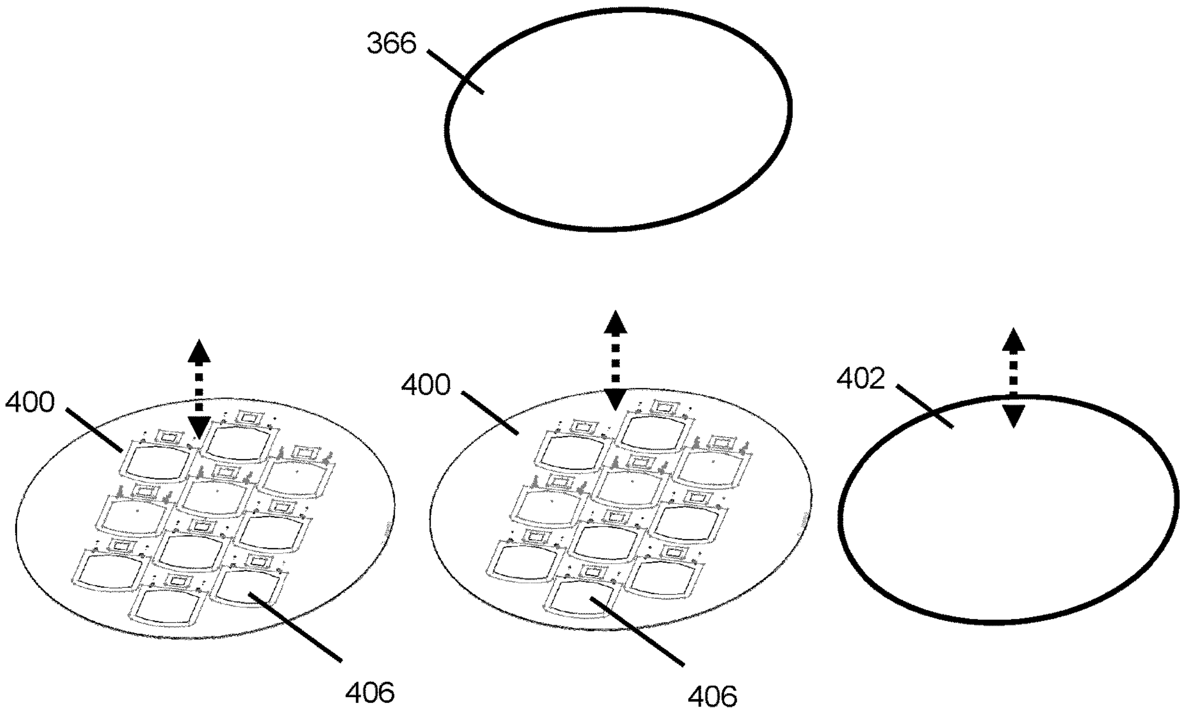
FIG. 4*b* shows another schematic representation of manufacturing optical waveguides.
Figure 4C:
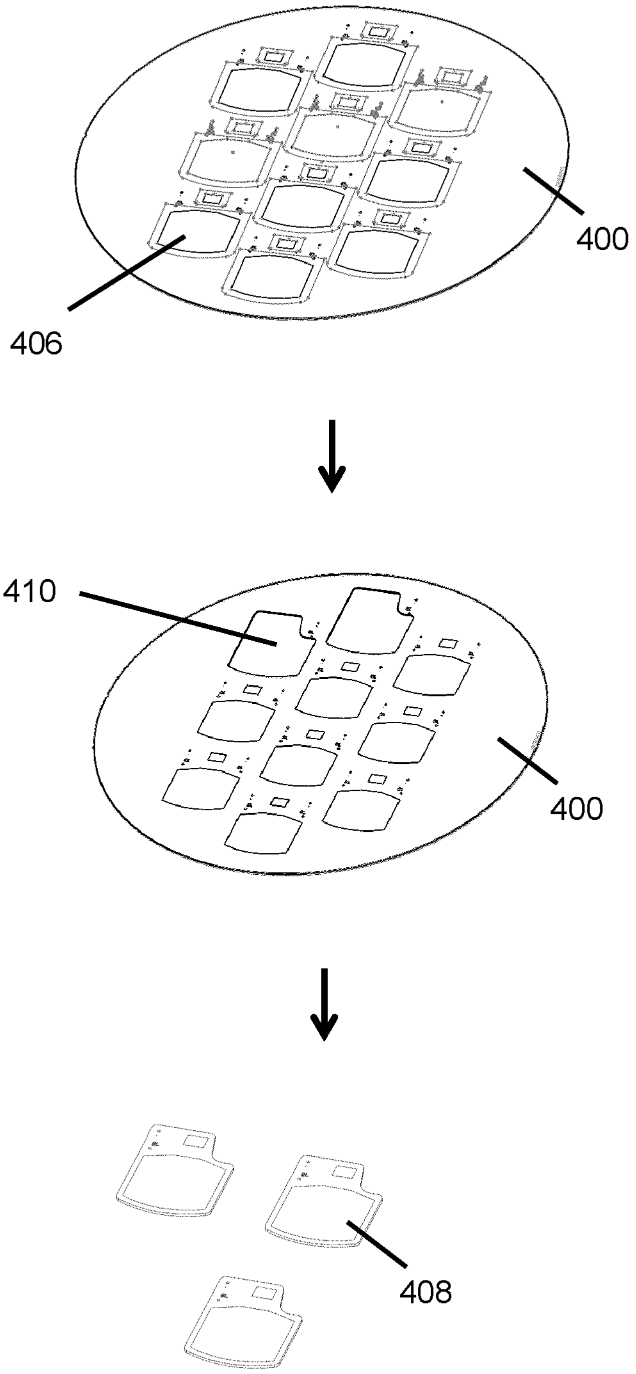
FIG. 4*c* shows a schematic representation of optical waveguides cut from an production optical wafer.

FIGS. 4A and 4B illustrate in schematic form the use of the working stamp 366 for forming of one or more production optical wafers 400. This process is similar to that described above in relation to FIG. 3B in which the master template stamp 310 is used to form one or more master template copies 338, where the mould structures 376 of the working stamp 366 are pressed against a wafer or substrate 402 having an imprintable coating 404, curing the imprintable coating 404 by heat and/or UV light, and separating the working stamp 366 to provide a production optical wafer 400 having a plurality of individual waveguide structures 404. FIG. 4C shows a schematic representation of individual optical waveguides 408 being cut 410 from a production optical wafer 400.

Figure 5:
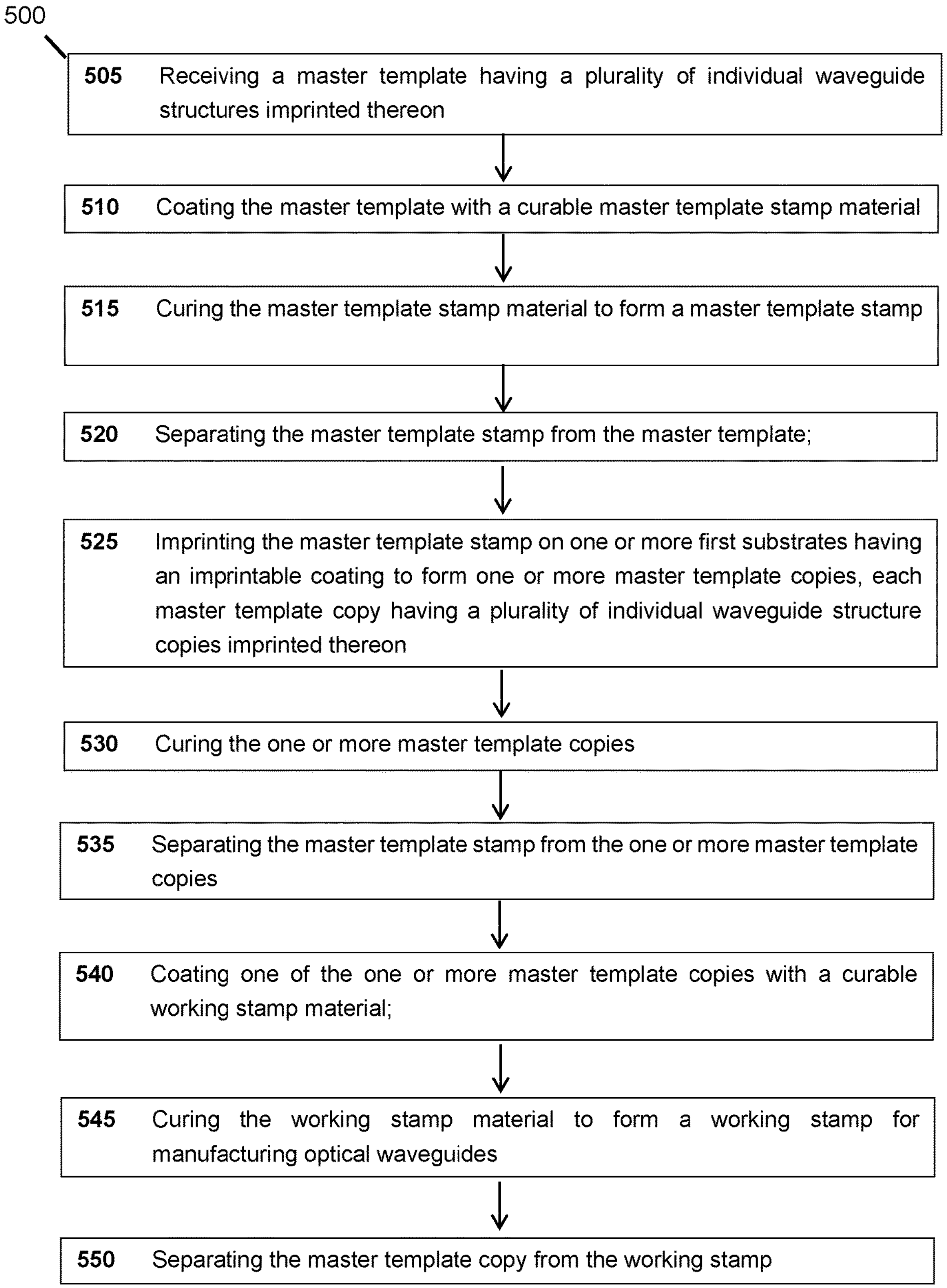
FIG. 5 is a flowchart illustrating a method for creating a working stamp according to the present invention.

FIG. 5 sets out a method 500 for manufacturing an optical waveguide working stamp.

At step 505 a master template is received. The master template has a plurality of individual waveguide structures on its surface, and may be a SnR master template having multiple repeated copies of a single waveguide structure.

At step 510 the master template is coated with a curable template stamp material. After coating the master template, the template stamp material is cured by heat and/or UV light to harden the curable template stamp material at step 515, and the master template stamp is separated from the master template at step 520.

At step 525 the master template stamp is then imprinted onto one or more substrates having an imprintable coating (e.g. imprint resist spin coated wafers) to form one or more master template copies (e.g. SnR master template copies), and cured at step 530 to harden the imprinted imprintable coating of the one or more substrates. The master template stamp is separated from the one or more master template copies at step 535.

At step 540 one of the master template copies is coated with a curable working stamp material, cured at step 545 and the master template copy is separated from the cured working stamp at step 550. The working stamp is then used for manufacturing optical waveguides as will be apparent to the person skilled in the art.

The invention claimed is:

1. An optical waveguide manufacturing method comprising:
  - receiving a master template having a plurality of individual waveguide structures imprinted thereon;
  - coating the master template with a curable master template stamp material;
  - curing the master template stamp material to form a master template stamp;
  - separating the master template stamp from the master template;
  - imprinting the master template stamp onto one or more first substrates having an imprintable coating to form one or more master template copies, each master template copy having a plurality of individual waveguide structure copies imprinted thereon;
  - curing the one or more master template copies;
  - separating the master template stamp from the one or more master template copies;

coating one of the one or more master template copies with a curable working stamp material;
  - curing the working stamp material to form a working stamp for manufacturing optical waveguides; and
  - separating the master template copy from the working stamp.

2. The method of claim 1 further comprising:
  - imprinting the working stamp onto a second substrate having an imprintable coating to form an optical waveguide wafer, the optical waveguide wafer having a plurality of optical waveguides imprinted thereon;
  - curing the optical waveguide wafer;
  - separating the working stamp from the optical waveguide wafer; and
  - cutting the optical waveguide wafer to separate each optical waveguide from the plurality of optical waveguides.

3. The method of claim 1, further comprising optically testing at least one of the one or more master template copies.

4. The method of claim 3, wherein at least one of the one or more master template copies is made of a substantially optically transparent material.

5. The method of claim 4, wherein the master template copy comprises a glass substrate coated with an optical polymer.

6. The method of claim 1, wherein at least one of the one or more master template copies comprises a silicon substrate.

7. The method of claim 1, wherein at least one of the one or more master template copies comprises a polymer material for nanoreplication.

8. The method of claim 1, further comprising controlling a shape in at least one of the plurality of individual waveguide structure copies.

9. The method of claim 8, wherein controlling the shape comprises a coating deposition technique.

10. The method of claim 8, wherein controlling the shape further comprises applying a plasma treatment.

11. The method of claim 1, further comprising applying an anti-sticking layer to one or more of:

the master template;

the one or more master template copies; or the working stamp.

12. The method of claim 1, wherein the master template is formed by a step and repeat nanoimprint process.

13. The method of claim 2, wherein:

at least one of the one or more master template copies is made of a substantially optically transparent material;

the master template is formed by a step and repeat nanoimprint process; and the method further comprises:

controlling a shape in at least one of the plurality of individual waveguide structure copies by:

a coating deposition technique; and applying a plasma treatment;

optically testing at least one of the one or more master template copies; and applying an anti-sticking layer to one or more of:

the master template;

the one or more master template copies; or the working stamp.

14. An optical waveguide manufactured using a working stamp manufactured according to the method of claim 1.

15. An optical waveguide manufactured according to the method of claim 2.

* * * * *